Dec. 14, 1937.                A. LANGSNER                2,102,364
              SPIRIT LEVEL AND MEANS FOR MOUNTING SAME
                       Filed Dec. 23, 1935
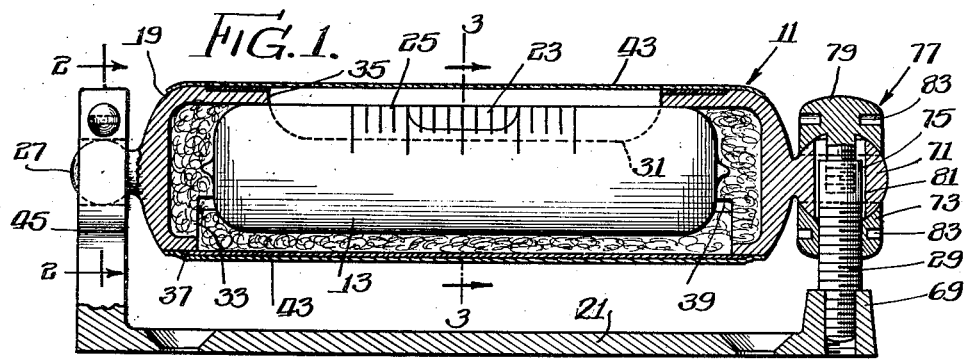
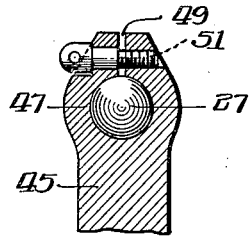
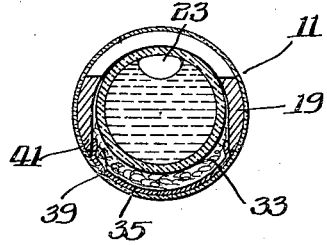
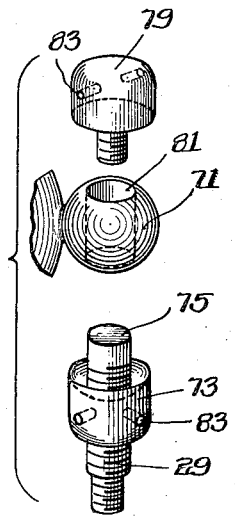
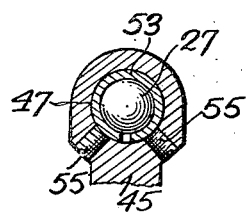
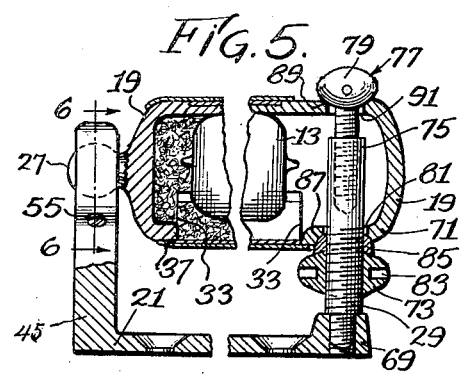
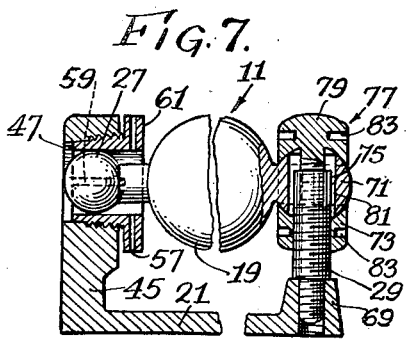
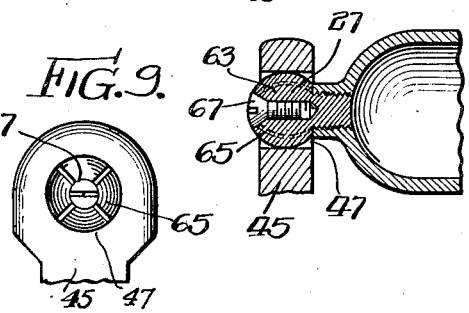
Inventor:-
Adolph Langsner
By:- Cox & Moore  attys.

Patented Dec. 14, 1937

2,102,364

UNITED STATES PATENT OFFICE 2,102,364

SPIRIT LEVEL AND MEANS FOR MOUNTING SAME

Adolph Langsner, Chicago, Ill., assignor to Eugene Dietzgen Company, Chicago, Ill., a corporation of Delaware Application December 23, 1935, Serial No. 55,767

9 Claims. (Cl. 33—214)

My invention relates in general to spirit levels and means for mounting and adjusting the same.

An important object of the invention is to provide a spirit level comprising a vial and a housing for the vial of simplified and improved construction, whereby it may be quickly and easily assembled in the housing in securely mounted position and as readily removed for repair and replacement, the housing having an opening for the insertion and removal of the vial and a cover for said opening.

Another important object is to provide a mounting for a spirit level including means whereby the same may be adjusted to a desired angularity in the mounting.

Another object is to provide for adjusting one end of a spirit level on its mounting while supporting the opposed end of the level for tilting movement on the mounting; a further object being to provide for clamping the tiltably mounted end of the spirit level assembly.

Another object is to provide a ball and socket mounting at one end of a vial housing whereby the axial alignment of the device may be controlled by shifting the other end of the housing; a further object being to provide clamping means for securing the ball in its socket.

A still further object is to resiliently clamp the ball in place in the socket.

Another object resides in providing a resilient expansible ball element adapted to yieldingly expand in the socket in order to firmly mount one end of the spirit level.

Another object is to provide a spirit level including a housing tiltably mounted as by means of a ball and socket at one end of the housing, including means at the other end of the housing for accurately adjusting the angularity of the spirit level in its mounting; a further object being to provide a threaded post and spherical support means adjustably on the post and adapted to receive a corresponding portion of the housing including clamping means carried by the post for securing together the co-operating spherical portions of the housing and said support means.

Numerous other objects, advantages, and inherent functions of the invention will be apparent from the following description, which, taken in connection with the accompanying drawing, discloses preferred embodiments of the invention.

Referring to the drawing:

Figure 1 is a longitudinal section taken through a spirit level and mounting embodying my present invention;

Figure 2 is a sectional view of the mounting taken along the line 2—2 in Figure 1;

Figure 3 is a sectional view taken substantially along the line 3—3 in Figure 1;

Figure 4 is an exploded view of the adjustable parts forming the mounting at one end of the assembly shown in Figure 1;

Figure 5 is a longitudinal section taken through a spirit level to show a modified form of mounting embodying the invention;

Figure 6 is a sectional view taken substantially along the line 6—6 in Figure 5;

Figure 7 is a longitudinal section taken through a spirit level to show a modified form of mounting embodying the invention;

Figure 8 is a sectional view illustrating a modified form of the mounting; and

Figure 9 is a perspective view showing the end of the mounting illustrated in Figure 8.

To illustrate my invention, I have shown on the drawing, a spirit level 11 comprising a vial 13 and a vial housing 19, and mounting means 21 for the vial and its housing.

The vial 13 preferably comprises a cylindrical capsule of transparent material, such as glass, containing a liquid almost completely filling the capsule in order to define an air bubble 23 adapted to shift in the capsule as the same is tilted. The upper side of the capsule may be graduated as shown at 25, if desired, in order to indicate the position of the bubble. The vial housing preferably comprises a cylindrical shell, the internal diameter of which is formed to receive the vial and a resilient packing for holding the vial in place. The housing preferably has a ball 27 formed thereon at one end, the other end being formed to receive a support comprising a threaded stem 29. The upper surface of the housing is provided with an opening 31 forming a window through which the graduated surface of the vial 13 is exposed when the same is mounted in the housing.

The housing 19, on its side opposite from the window opening 31, is formed with an elongated opening 33, which is wide enough to permit the vial to be inserted in the housing, said opening 33 having a length at least equal to the length of the vial to facilitate insertion of the vial in the housing.

The opening 33 is normally closed by means of a cover plate 35, the opposed ends of which rest, as at 37, upon the circular edges of the end walls of the housing, which define the opening 33. The lateral edges of the cover element 35 are bent inwardy as at 39 to clip the longitudinal edges 41 of the housing and the cover element, preferably comprising a resilient sheet metal piece, the bent edges 39 of which are adapted to resiliently engage the housing in order to support the same in place.

If desired, the cover may be additionally secured on the housing and the vial cavity of the housing tightly sealed against the entrance of foreign matter by applying a sleeve-like membrane 43 about the housing, said membrane comprising a pellicular material, such as Cellophane, adapted to be applied in moist or damp condition and to shrink itself tightly upon the housing in order to seal the edges of the cover and overlie the window 31, the pellicular material being transparent in order to reveal the position of the air bubble 23 through the window 31.

The vial is assembled in the housing so that its graduated portion 25 extends opposite the opening 31. The remaining space within the housing is then filled with the resilient backing, the cover 35 is applied, and finally the pellicular sheet 43 is assembled and permitted to tighten upon the parts.

When the vial and its housing are held horizontal, the air bubble 23 will appear centrally in the window, its exact position being gauged by the graduations 25. If the assembly is tilted in one direction or the other, the bubble will move with respect to the scale.

The vial and its housing, according to my present invention, may be made in any suitable or convenient size for various purposes and may be mounted in any convenient position. I have, however, provided novel means including the mounting bracket 21 for mounting the vial housing and I prefer to secure at least one end of the housing adjustably on the bracket in order to permit the vial to be accurately adjusted on the bracket as, for instance, to bring it to horizontal position even though the bracket itself may not be exactly horizontal.

I prefer also to mount at least one end of the housing for tilting or swivelling movement about a fixed point with respect to the bracket in order to allow adjustment of the other end, and the shiftable end may be secured at an adjusted elevation with respect to the bracket in order to accomplish adjustment of the spirit level. To this end, the bracket 21 has an upright portion 45 formed with a socket 47 to receive the spherical housing portion 27. The socket 47 may be formed accurately to snugly receive the spherical portion 27, which has a universal swiveling movement therein. As shown in Figures 1 and 2, I may provide a slot 49 in the portion 45 and a clamping element comprising a screw 51 so that the socket 47 may normally be clamped upon the spherical portion 27 to secure the spherical portion against rattling in the socket. By loosening the clamping element 51, however, the socket may be conditioned to release the spherical portion 27 for free universal swiveling movement during adjustment of the level, after which the clamping element may again be tightened to clamp the socket upon the spherical element and prevent rattling of the parts.

As an alternate construction, I may provide the socket 47 interiorly with a split sleeve 53, as shown in Figures 5 and 6, clamping elements, such as set screws 55, being provided in the upright 45 in order to clamp the sleeve 53 upon or release said bushing from the spherical portion 27.

I may also, as shown in Figure 7, provide an annular clamping gland 57, comprising a sleeve longitudinally split as at 59 and adapted to be threaded into the socket 47 in position to clamp the spherical element 27 securely in the upright 45. The gland may have a flanged head 61 to facilitate turning of the same.

In Figures 8 and 9, I have shown an arrangement wherein the spherical portion 27 comprises a core 63 carrying a split casing 65, the diameter of which is determined by the screw 67 which threads into the core. In this embodiment, the size of the socket 47 remains constant and rattling is eliminated by tightening the screw 67 after the spherical element has been inserted in the socket 47.

One end of the housing 19 may thus be mounted swivelingly by means of the spherical portion 27 on the upright 45. I have also provided novel means whereby the elevation of the opposite end of the housing may be varied in order to adjust the tilted position of the spirit level on its mounting.

To this end, the threaded stud 29 is secured in any suitable fashion to the bracket 21, preferably by threading its lower end into a boss 69 formed in the bracket.

The threaded stud extends upwardly of the boss 69 and, at its upper end, enters a perforated portion 71 formed on the housing 19. The stud, beneath said perforated portion 71, carries a nut 73 adjustable axially on the stud in order to determine the elevation at which the perforated portion 71 is supported on the stud. The upper end of the stud is formed with a threaded socket 75 adapted to receive a clamping screw 77, having a threaded shank, adapted to enter the perforated portion 71 and thread into the threaded socket 75, and a head 79 extending above the perforated portion 71 and adapted to engage the top thereof in order to clamp said portion 71 against the nut 73 so as to secure the housing 19 at a desired elevation on the stud. It will be noted that the perforated portion 71 has spherical surfaces co-operating with corresponding surfaces formed on the screw 79 and the nut 73 whereby said portion 71 may be firmly and snugly clamped by and between said parts in all axially adjusted positions of the portion 71 on the stud 79. It will be noted also that the perforated portion 71 has a channel 81, which is substantially larger than the stud 29 so that the perforated portion loosely fits the stud to the end that there is no interference between said parts throughout the adjustable range of the housing on the stud.

In the embodiment shown in Figures 1 and 4, the perforated portion 71 comprises a spherical ball attached to one end of the housing, while, in the form shown in Figure 5, the perforated portion simply comprises an end of the housing, the walls of which are drilled to accommodate the stud and the clamping screw 77. In the form shown in Figure 1, also, the spherical portion 71 is received directly in concave seats formed in the adjusting nut 73 and in the head 79 of the clamping screw. The nut 73 and screw head 79 may also be formed with sockets 83 to facilitate turning of the same.

In the embodiment shown in Figure 5, the clamping nut 73 may also be formed with sockets 83 to facilitate turning of the same upon the stem but the nut preferably carries or supports a bearing portion or element 85 having an upwardly facing spherical convex surface adapted to engage in a corresponding concave seat 87 formed in the housing at the opening 81. The head 79 of the clamping screw, shown in the embodiment illustrated in Figure 5, has downwardly facing spherical convex surfaces adapted to engage a corresponding concave seat formed in the housing at the opening 91 through which the shank of the clamping screw extends in position to engage the socket of the stem 29.

The foregoing construction permits one end of the housing to be adjusted vertically with respect to the support bracket 21 by merely turning the clamping screws 77 and the adjusting nuts 73. The co-operating spherical seat and clamping nut surfaces provide for securely fastening said end of the housing in adjusted position on the stem 29. The other end of the housing, however, is permanently anchored for swiveling movement about a center, which coincides approximately with the center of the spherical element 27. This universal swiveling movement permits the adjustment of the opposite end of the housing, which adjustment is facilitated by slightly loosening the clamping means by which the spherical element is normally clamped in its socket. After the housing has been adjusted, the parts may be tightened in order to prevent any rattling or slight vibrational movement of the housing and vial with respect to the mounting bracket 21.

It is thought that the invention and its numerous attendant advantages will be fully understood from the foregoing description and it is obvious that changes may be made in the form, construction, and arrangement of the several parts without departing from the spirit or scope of the invention and without sacrificing its attendant advantages, the preferred forms herein described being disclosed merely for the purpose of illustrating the invention.

Having thus described my invention, what I claim as new and desire to secure by Letters Patent is as follows:

1. A spirit level comprising an elongated element, a support, cooperating means formed on said support and on one end of said element for swivelingly mounting said end on the support, said element having a mounting portion remote from said end and formed with an opening therethrough, said mounting portion having oppositely-facing, spherical surfaces formed thereon at the opposed ends of said opening, a threaded post carried by said support in position to extend through said opening, a threaded nut adjustable on said post and carrying a spherical portion for engagement with the spherical surface on one side of the mounting portion whereby to support the same adjustably on the post to determine the angularity of said element with respect to the support, and clamping means having a threaded portion engaging said post and a spherical portion adapted to engage the spherical surface on the opposite side of said mounting portion for clamping said portion in adjusted position between said nut and said clamping element.

2. A spirit level comprising an elongated element having a spherical projection at one end, a mounting portion remote from said projection, support means comprising a socketed element for swivelingly receiving said spherical projection and adjustable means co-operatively associated with said mounting portion for determining the angularity of said element with respect to the support, said adjustable means comprising a threaded post carried by said support, a threaded nut on said post supporting said mounting portion adjustably on the post, said threaded nut and mounting portion having co-operating spherical bearing surfaces, and a stud having a stem threaded in the post and a head for clamping the mounting portion on said nut with said spherical surfaces in engagement.

3. A spirit level comprising an elongated element having a spherical projection at one end, a mounting portion remote from said projection, support means comprising a socketed element for swivelingly receiving said spherical projection and adjustable means co-operatively associated with said mounting portion for determining the angularity of said element with respect to the support, said mounting portion comprising a spherical ball having a channel therethrough and said adjustable means comprising a threaded post carried by said support and extending loosely in said channel, a threaded nut on said post having spherical surfaces forming a seat for receiving said ball and carrying the same adjustably on the post, and a stud having a stem threaded in the post and a head formed with a spherical surface for engaging and clamping said ball in place on said seat.

4. A spirit level comprising an elongated element having a spherical projection at one end, a mounting portion remote from said projection, support means comprising a socketed element for swivelingly receiving said spherical projection, adjustable means co-operatively associated with said mounting portion for determining the angularity of said element with respect to the support, said adjustable means comprising a threaded post carried by said support, a threaded nut on said post and supporting said mounting portion adjustably on the post, and means comprising a headed screw threading in said post and bearing on said mounting portion for clamping the same on said nut, said mounting portion and clamping screw having co-operating spherical bearing surfaces and said nut having a spherical surface seating upon a corresponding surface formed in said mounting portion.

5. A spirit level comprising an elongated element having a spherical projection at one end, a mounting portion remote from said projection, support means comprising a socketed element for swivelingly receiving said spherical projection, an adjustable portion co-operatively associated with said mounting portion for determining the angularity of said element with respect to the support, said adjustable portion comprising a threaded post carried by said support, a threaded nut on said post and supporting said mounting portion adjustably on the post, and means comprising a headed screw threading in said post and bearing on said mounting portion for clamping the same on said nut, said mounting portion and clamping screw having co-operating spherical bearing surfaces and a bearing block having a spherical surface carried by said nut, with its spherical surface seating upon a corresponding surface formed on said mounting portion.

6. A spirit level comprising an elongated element having a spherical projection at one end, a mounting portion remote from said projection, support means comprising a socketed element for swivelingly receiving said spherical projection, an adjustable portion co-operatively associated with said mounting portion for determining the angularity of said element with respect to the support, a sleeve mounted in said socketed element and receiving the spherical portion, and means to contract said sleeve upon the projection to clamp it in the socketed element.

7. A spirit level comprising an elongated element having a spherical projection at one end, a mounting portion remote from said projection, support means comprising a socketed element for swivelingly receiving said spherical projection, an adjustable portion co-operatively associated with said mounting portion for determining the angularity of said element with respect to the support, an expansible sleeve threaded in said socketed element and receiving the spherical portion, said sleeve being adapted to contract upon and clamp the projection as the sleeve is screwed into the socketed element.

8. A spirit level comprising an elongated element having means for supporting the element for tilting movement on a support, a spherical mounting portion formed on said element remote from said means, said spherical mounting portion having a diametral opening therein, adjustable means cooperatively associated with said mounting portion for determining the angularity of said element with respect to the support, comprising a threaded post carried by said support and extending in said diametral opening, a nut threaded on said post and providing a spherical seat for receiving one side of the spherical mounting portion at one end of the diametral opening, said post having an end extending in said opening and provided with a threaded socket, and a stud having a stem threaded in said socket and a head formed with a spherical portion for engaging the other side of said spherical mounting portion at the other end of said diametral opening.

9. A spirit level comprising an elongated element having a spherical projection at one end, a mounting portion remote from said projection and formed with an opening therethrough, said mounting portion having oppositely-facing, spherical surfaces formed thereon at the opposed ends of said opening, support means comprising a socketed element for swivelingly receiving said spherical projection, and adjustable means co-operatively associated with said mounting portion for determining the angularity of said element with respect to the support means, said adjustable means comprising a threaded post carried by said support means in position to extend in said opening, a threaded nut on said post carrying a spherical portion for engagement with the spherical surface on one side of the mounting portion to support the same adjustably on the post, and clamping means having a threaded portion engaging said post and a spherical portion adapted to engage the spherical surface on the opposite side of said mounting portion for clamping the mounting portion between said nut and said clamping means.

ADOLPH LANGSNER.